United States Patent
Chenowth

(10) Patent No.: US 6,435,595 B1
(45) Date of Patent: Aug. 20, 2002

(54) RETRACTABLE TARPAULIN COVER APPARATUS FOR OPEN-TOPPED CONTAINER

(76) Inventor: Lynn Chenowth, 1404 N. Marshall Ave., El Cajon, CA (US) 92020

( * ) Notice: Subject to any disclaimer, the term of this patent is extended or adjusted under 35 U.S.C. 154(b) by 0 days.

(21) Appl. No.: 09/872,834

(22) Filed: Jun. 1, 2001

(51) Int. Cl.[7] .................................................. B60P 7/02
(52) U.S. Cl. .............................. 296/100.13; 296/100.11; 74/89.22
(58) Field of Search ....................... 296/100.01, 100.11, 296/100.13, 100.15, 100.16, 100.12; 160/84.02, 84.06, 84.01; 74/89.22

(56) References Cited

U.S. PATENT DOCUMENTS

| | | |
|---|---|---|
| 411,165 A | 9/1889 | Noack |
| 1,071,502 A | 8/1913 | Boufford |
| 1,718,183 A | 6/1929 | Smith |
| 2,773,547 A | 12/1956 | Voss |
| 2,963,255 A | 11/1960 | Trott |
| 3,138,399 A | 6/1964 | Hughes |
| 3,146,824 A | 9/1964 | Veilleux |
| 3,520,515 A | 7/1970 | Pomagalski et al. |
| 3,756,650 A | 9/1973 | Michel |
| 3,768,540 A | 10/1973 | McSwain |
| 3,949,969 A | 4/1976 | Kaufer |
| 3,977,719 A | 8/1976 | Thurston |
| 4,046,416 A | 9/1977 | Penner |
| 4,067,603 A | 1/1978 | Fenton |
| 4,215,897 A | 8/1980 | Aiken et al. |
| 4,479,677 A | 10/1984 | Gulette et al. |
| 4,557,465 A | 12/1985 | Lundberg |
| 4,725,090 A | 2/1988 | Weaver |
| 4,854,630 A | 8/1989 | Biancale |
| 4,858,984 A | 8/1989 | Weaver |
| 4,932,715 A | 6/1990 | Kramer |
| 5,009,353 A | 4/1991 | Alquist |
| 5,050,923 A | 9/1991 | Petelka |
| 5,067,767 A | 11/1991 | Biancale |
| 5,080,422 A | 1/1992 | DeMonte et al. |
| 5,080,423 A | 1/1992 | Merlot et al. |
| 5,102,182 A | 4/1992 | Haddad, Jr. |
| 5,145,230 A | 9/1992 | Biancale |
| 5,152,575 A | 10/1992 | DeMonte et al. |
| 5,179,989 A | * 1/1993 | Schon .................. 160/84.02 X |
| 5,253,914 A | 10/1993 | Biancale |
| 5,319,881 A | 6/1994 | Kuhlman |
| 5,429,408 A | 7/1995 | Henning et al. |
| 5,498,057 A | 3/1996 | Reina et al. |
| 5,690,377 A | * 11/1997 | Denyer ................... 296/100.15 |
| 5,938,270 A | * 8/1999 | Swanson et al. ........ 296/100.11 |
| 6,142,554 A | * 11/2000 | Carroll et al. .......... 296/100.12 |

FOREIGN PATENT DOCUMENTS

| | | | | |
|---|---|---|---|---|
| FR | 2 645 090 | | 10/1990 | |
| FR | 2 646 817 | | 11/1990 | |
| FR | 2 653 478 | | 4/1991 | |
| JP | 356013229 A | * | 2/1981 | ............ 296/100.13 |
| WO | WO 96/33882 | | 10/1996 | |

* cited by examiner

*Primary Examiner*—Joseph D. Pape
*Assistant Examiner*—Jason Morrow
(74) *Attorney, Agent, or Firm*—Brown, Martin, Haller & McClain, LLP

(57) ABSTRACT

A cover apparatus for an open-topped container such as a trailer or truck bed has a cover for extending over the open top of the container, a plurality of spaced, parallel bows extending between opposite sides of the cover, each bow having a guide at each end, an endless cable running through the guides at each end of each bow, a front one of the bows being secured to the cable and the guides on the remaining bows engaging slidably on the cable. A plurality of support pulleys support the cable to extend in a predetermined path along the opposite sides of the container, and a pair of meshing gear drive pulleys control movement of the cable to extend and retract the cover. A reversible drive motor is linked to one of the gear drive pulleys.

22 Claims, 4 Drawing Sheets

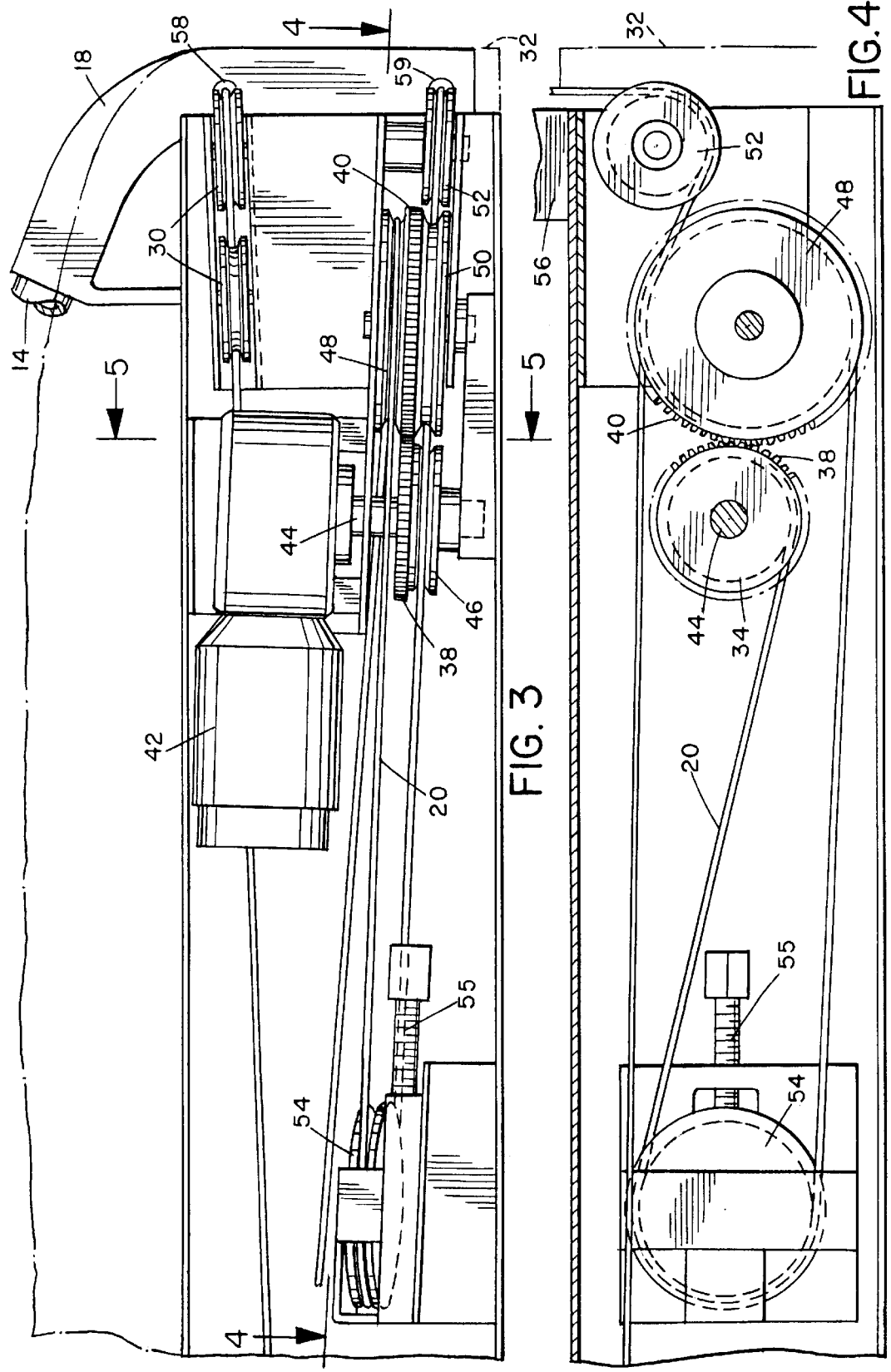

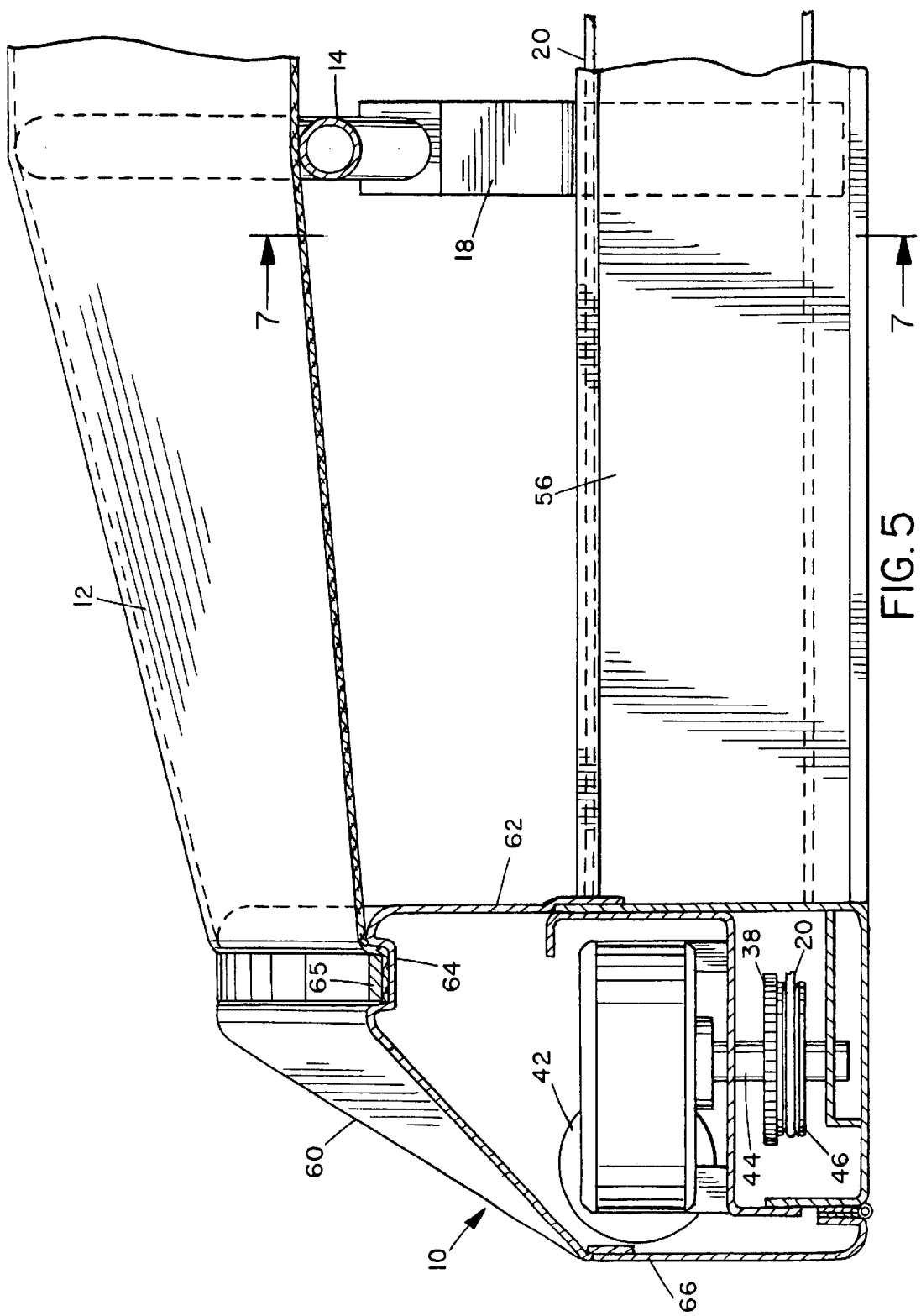

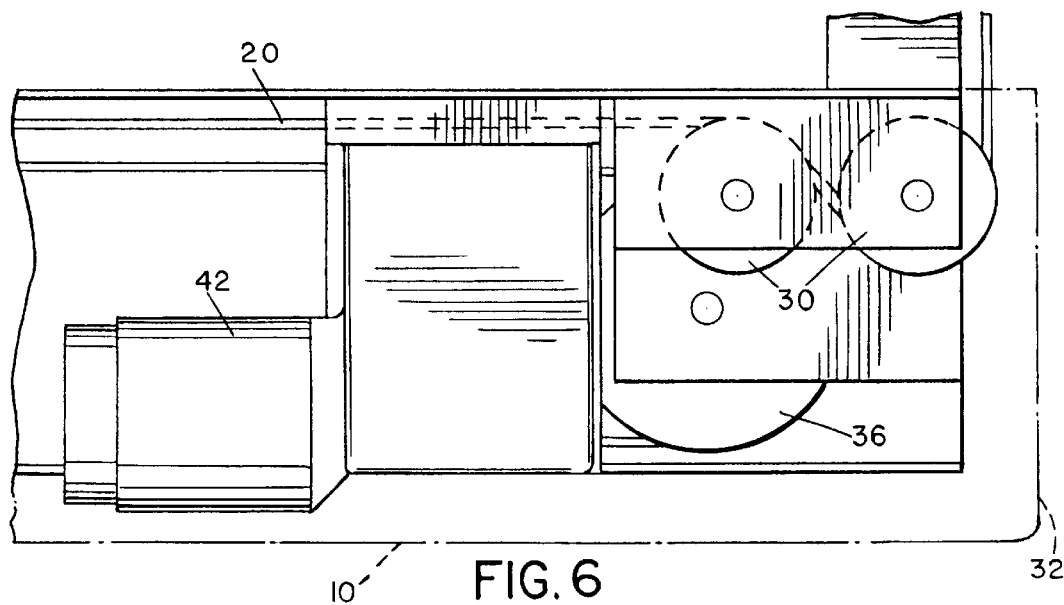
FIG. 6
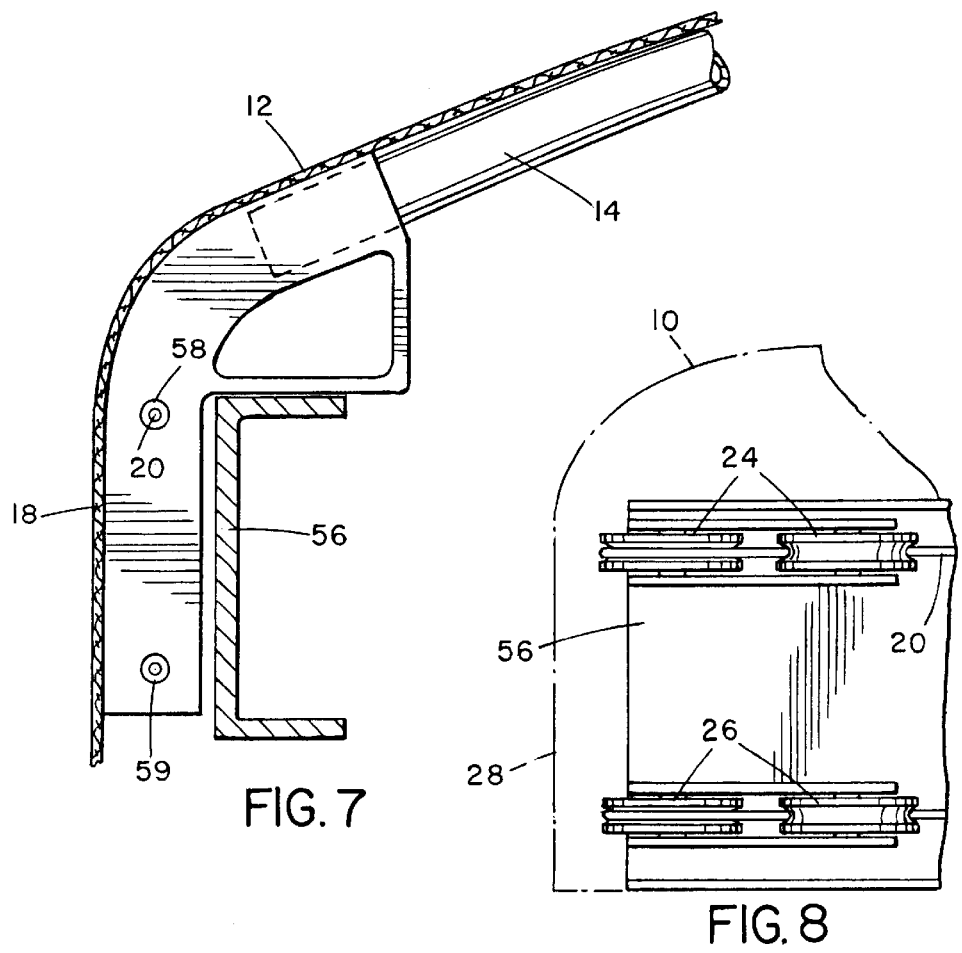
FIG. 7
FIG. 8

RETRACTABLE TARPAULIN COVER APPARATUS FOR OPEN-TOPPED CONTAINER

BACKGROUND OF THE INVENTION

The present invention is concerned with a retractable cover apparatus for an open-topped container such as a truck or trailer bed, and is particularly concerned with a cable drive assembly for operating the apparatus.

Conventional truck and truck trailer bodies used in the transport of various materials such as sand, gravel, grain, or other loose material are of open frame construction with a base, upstanding side and end walls, and an open top. Clearly, the open top of such containers poses problems, since wind may blow material from the top of the truck, potentially causing a driving hazard, and produces wind resistance and drag on the truck movement.

In view of these problems, such open topped containers are often covered with a tarpaulin so as to protect the cargo and reduce drag. In some cases, a tarpaulin is wound on a roller at one end of the container opening, and is pulled out manually over the load before being tied down. On arrival at the load destination, the tarpaulin is released and wound back onto the roller by a spring. This approach requires considerable manual effort in deploying and tying down the tarpaulin, and potentially causes risk to the operator. Also, if the cover is not properly tied down, it will tend to lift off the trailer at high speeds, potentially tearing away and causing a hazard to the truck driver and others.

Cable operated cover systems are known, in which a cover is attached at one end to an end of the container opening, and at the other end to endless cables extending along the sides of the container or trailer bed. The cables extend around sheaves or pulleys. A reversible electric motor or hand crank drives a sprocket, which in turn rotates a sheave around which the cable extends. Some such systems have separate endless cables along opposite sides of the truck or trailer bed, but this can cause jamming of the front end of the tarpaulin if the two cables are not precisely matched. A system of this type is described, for example, in U.S. Pat. No. 5,253,914 of Biancale.

The single cable top slider system manufactured by Pulltarps Mfg. of San Diego, Calif., avoids such problems by attaching the front end of the tarpaulin to the same cable on both sides. In this system, an endless cable extends around guide pulleys to travel in a path along one side of the open container, one end of the container, the opposite side of the container, and then back along the same path to complete the loop. Thus, movement of the cable causes cooperative movement of opposite sides of the tarpaulin. Another single cable drive system is described in U.S. Pat. No. 5,145,230 of Biancale. In each case, a suitable hand or motor driven winch is provided for driving the cable. One problem with such systems is the difficulty in mounting them on the truck bed or trailer. Each of the pulleys, the winch, and the drive motor, must be mounted separately and in proper alignment. Another problem is potential cable slipping on the winch, jamming the tarpaulin movement.

SUMMARY OF THE INVENTION

It is an object of the present invention to provide a new and improved retractable tarpaulin cover apparatus and cable drive assembly therefor.

According to one aspect of the present invention, a cover apparatus for an open-topped container such as a trailer or truck bed is provided, which comprises a cover for extending over the open top of a container, the cover having opposite sides, a plurality of spaced, parallel bows extending between opposite sides of the cover, each bow having a guide at each end; an endless cable running through the guides at each end of each bow, a rear one of the bows being secured to the cable and the guides on the remaining bows engaging slidably on the cable; a plurality of support pulleys for supporting the cable to extend in a predetermined path along the opposite sides of the container; and la pair of meshing gear drive pulleys for controlling movement of the cable to extend and retract the cover, a reversible drive motor linked to one of the gear drive pulleys, and the cable extending at least partially around each of the gear drive pulleys.

In one embodiment, the gear drive pulleys each have at least one cable receiving groove and a series of gear teeth meshing with the teeth of the other drive pulley, reducing or eliminating the risk of cable slipping. An adjustable tensioning pulley may be provided for adjusting cable tension, and a first one of the gear drive pulleys may have two spaced cable grooves, with the cable passing around one of the grooves in the first drive pulley, around the groove in the second drive pulley, then around the tensioning pulley, and back around the other groove in the first drive pulley. The tensioning pulley may be positioned at a selected spacing from the gear drive pulleys in order to provide the desired cable tension for proper operation of the drive assembly.

In one embodiment of the invention, an elongate housing having opposite first and second ends is provided for mounting at one end of a container to be covered, the housing having a cable access opening at each end. Some of the support pulleys as well as the motor and gear drive pulleys are mounted in the housing. This makes the retractable cover assembly much easier to install on a truck or trailer bed. The housing may have an upper, aerodynamically shaped wall to which one end of the cover is secured, with the wall suitably aligned to form a smooth, aerodynamic shape between the wall and next adjacent bow of the cover. This avoids the problem of a flat region of the cover, which previously arose when a cover was simply secured flat to one end of container opening, and could give rise to wind drag. The enclosure is suitably waterproof to reduce the risk of damage to the motor or gear drive pulleys in inclement weather conditions or due to wind pressures when the truck is driven at high speeds.

The arrangement of meshing gear drive pulleys provides a considerable improvement in operation of the retractable cover, helping to overcome any jam or cable slipping. The provision of a self-contained housing for the motor, gear drive pulleys, and all of the support pulleys at one end of the container makes the original mounting of the apparatus on a truck or trailer bed much easier. It also provides a streamlined shape at the end of the cover, reducing wind drag so that there is less risk of the cover becoming detached or tearing away. The housing will,protect the drive assembly from damage, increasing the system lifetime.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 3 is a front view of the, drive mechanism with the housing cut away;

FIG. 4 is a sectional view taken, on line 4—4 of FIG. 3;

FIG. 5 is a sectional view taken on line 5—5 of FIG. 3;

FIG. 6 is a top view of the mechanism shown in FIG. 3;

FIG. 7 is a sectional view taken on line 7—7 of FIG. 5; and

FIG. 8 is a front view of the pulley assembly at the end of the enclosure opposite to that shown in FIG. 3.

DETAILED DESCRIPTION OF THE DRAWINGS

Figure 1:
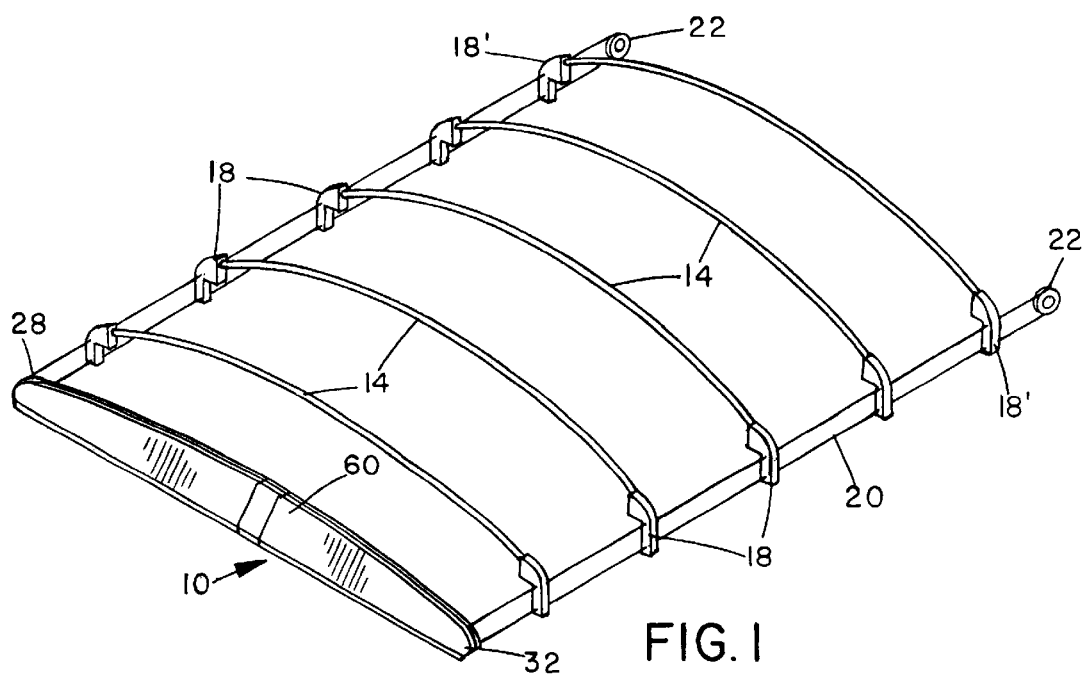
FIG. 1 is a perspective view of a retractable cover apparatus according to an exemplary embodiment of the invention, showing the forward housing.

FIG. 1 illustrates a retractable cover apparatus according to an exemplary embodiment of the present invention for covering an open-topped container such as a truck or trailer bed, while FIGS. 2 to 8 illustrate details of a fully enclosed drive assembly for the apparatus which is mounted in housing 10 at one end of a container, typically the front end.

The apparatus basically comprises a: cover 12 (see FIGS. 5 and 7) such as a tarpaulin having a series of spaced, bows 14 of generally arch-like shape which extend between opposite side edges of the cover, and a cable drive assembly 16 for driving the cover between an extended position fully covering the open top of the container, and a retracted position where the cover is folded up in a concertina-like fashion adjacent the housing 10. Each bow 14 has a slider 1 8 at each end, and an endless cable 20 runs through the sliders 18 along opposite sides of the apparatus, and then through the drive assembly in housing 10, as will be explained in more detail below. The sliders 18' on the bow 14 which is farthest away from the housing 10 are secured to the upper run of the cable 20 at each side, while all other sliders engage slidably over the cable.

The cable drive assembly includes a pair of vertically oriented support pulleys 22 positioned on opposite sides of the apparatus at a location which will correspond to an opposite end of the container to the end on which housing 10 is mounted. An upper and lower pair 24,26 of horizontally oriented support pulleys are also, mounted in one end 28 of the housing 10, and an upper pair of horizontally oriented support pulleys 30 is aligned with the upper pair 24 at the opposite end 32 of the housing 10. The cable drive assembly 16, which is best illustrated in FIGS. 2 to 5, is mounted in the end 32 of the housing beneath the pulleys 30. The drive assembly basically comprises a pair of meshing, gear drive pulleys 34,36 having meshing gear teeth 38,40 around their perimeter, and a reversible drive motor 42 having a drive axle 44 connected to gear drive pulley 34. As best illustrated in FIGS. 3 and 4, gear drive pulley 34 also has an annular cable groove 46, while gear drive pulley 36 has an upper cable groove 48 and a lower cable groove 50 on opposite sides of the ring of gear teeth 40. The lower groove 50 is aligned with the groove 46 in pulley 34. For illustration purposes, the cable grooves and gears are shown separated in FIG. 2, with the gears spaced below the cable guide grooves, so as to illustrate the cable path more clearly. However, the gear 38 is actually positioned above and adjacent cable groove 46,, while gear 36 is positioned between cable grooves 48 and 50, as best illustrated in FIG. 3.

Figure 2:
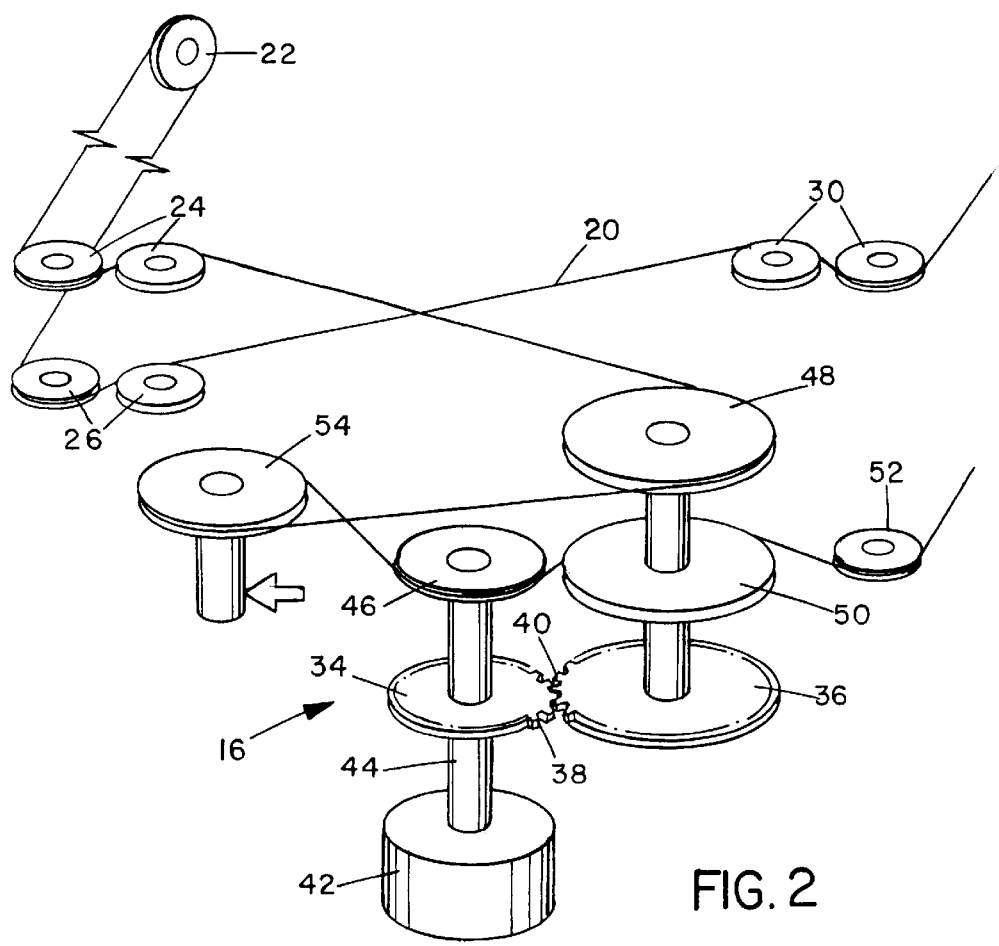
FIG. 2 is a diagram of the cable actuating system.

As best illustrated in FIGS. 2 to 4, a support or guide pulley 52 is positioned adjacent the lower cable groove 50 in drive pulley 36. An adjustment or tension pulley 54 is adjustably mounted in the housing 10 at a selected spacing from the cable drive assembly. The tension pulley 54 can be moved back and forth via adjustment screw 55 in order to adjust cable tension.

The cable 20 runs in a first direction along an upper run on one side of the apparatus from the first end 28 of the housing, around pulley 22, and back along a lower run to the first end off the housing, as indicated in FIG. 1. Similarly, the cable path on the opposite side of the apparatus runs along an upper run from the second end 30 of the housing, around pulley 22, and back along a lower run to the second end 30 of the housing. The cable path inside the housing is best illustrated in FIG. 2. From the upper run at the first end 28 of the housing, the cable 20 travels around support pulleys 24, then across to the opposite end 30 of the: housing along an inclined path and around the upper cable groove 48 of the gear drive pulley 36. From groove 48, the cable travels around tension adjustment pulley 54, and around the cable groove 46 in the other gear drive pulley 34 which is directly driven by motor 54. The cable then passes around the lower cable groove 50 in the gear drive pulley 36, around guide pulley 52, and out of the end 30 of the housing to travel along the lower run on the right hand side of the apparatus as viewed in FIGS. 1 and 2.

As best illustrated in FIG. 3, support pulleys 30 are tilted downwardly relative to the central longitudinal axis of the housing, so as to properly direct the cable from the upper run on one side of the container down to the support pulleys 26 for the lower run on the opposite side of the housing. Similarly, the gear drive pulleys 34 and 36, and associated cable grooves, are tilted upwardly, as seen in FIG. 3, in order to direct the cable from the lower run to the upper run on the opposite side of the container. The tension adjustment pulley is also tilted in:a similar manner so that the cable can travel in a straight, tangential path from the upper cable groove 48 to one side of pulley 54, as best illustrated in FIG. 3. Additionally, the pulley 54 is also tilted downwardly in the perpendicular direction between the front and rear walls of the housing, to accommodate a straight, tangential cable run from the rear side of pulley 54 down to the lower cable grooves 46 and 50, as indicated in FIG. 4.

After traveling back along the upper run of the cable path up to the second end 32 of the housing, the cable 20 passes back into the housing through a suitable opening, and then around the pair of upper support pulleys 30 at that end of the housing. The cable then travels in an inclined path crossing over the previous cable path, and back to the first end 28 of the housing, where it is guided around the lower pair of support pulleys 26, before exiting the housing and traveling back along the lower cable run on the left hand side of the apparatus.

As best illustrated in FIG. 7, each slider 18, 18' runs along a respective side beam 56 of the truck frame, and has a pair of spaced, upper and lower openings 58,59 through which the upper and lower runs of cable 20 extend. Sliders 18' are suitably secured to the cable by cable ties, end stops, or the like, in a conventional manner.

The housing 10 will now be described in more detail with reference to FIGS. 1 and 5. It may be made of any suitable waterproof, durable and rigid material, such as steel, hard plastic, or the like. Housing 10 is of generally rectangular shape but has an aerodynamically tapered upper wall 60 which tapers upwardly to meet the rear wall 62, and has a groove 64 adjacent its rear end in which the end 65 of the tarpaulin is suitably secured. The upper wall 60 is also arched between the opposite ends 28,32 of the housing, as best illustrated in FIGS. 1 and 3, with a curvature substantially matching that of the next adjacent bow 14, so that the groove 64 essentially acts as an end bow of the tarpaulin. This ensures a smooth and relatively wrinkle free transition from the housing up to the next bow 14, and the aerodynamic shape of the upper wall also helps to reduce wind resistance, vibration or fluttering of the tarpaulin. The front wall of the housing includes a hinged door 66 facing the cable drive assembly 16 which can be opened for maintenance purposes and for adjusting cable tension.

Operation of the cable drive assembly will now be described in more detail. The motor may be controlled by a suitable forward/reverse/off switch on the housing, or a remote control actuator may be used. A controller may optionally be provided for switching the motor off automatically when the cover is fully extended or retracted, with suitable detectors for detecting the respective end positions linked to the controller. The cover apparatus may be readily installed on any container, truck or trailer bed to be covered. The housing 10 is simply bolted across one end of the container, and the two end pulleys 22 suitably secured at the opposite end of the container. Housing 10 will normally be mounted at the front end of the container. The sliders 18 are suitably engaged over the opposite side beams of the container with the cover fully retracted. The apparatus can then be tested and the cable tension adjusted as needed. This apparatus can be installed both quickly and inexpensively either during truck or trailer manufacture, or retro-fitted to an existing truck or trailer bed, or other type of container with an open top requiring covering to protect the contents.

The cover or tarpaulin 12 will initially be in a retracted position, in which the forward end slider 18' is stacked up against the remaining sliders adjacent the rear wall of housing 10, with the tarpaulin folding up in a concertina-like fashion between each adjacent pair of sliders, and between the rear wall of the housing and next adjacent slider. Once the container has been filled with a product to be transported, the operator or driver turns on the motor in order to drive the cable in a first direction, such that the two forward sliders 18' travel with the cable from the housing 10 towards the opposite end of the container. When the cover is fully extended, in the position illustrated in FIG. 1, the motor is turned off, either automatically by a suitable controller, or by the operator. When the load is to be emptied, the operator simply turns on the motor in the reverse direction, such that the upper runs of the cable each move back towards the housing 10, along with slider 18', which in turn pushes all the other sliders back until they are again stacked against housing 10.

The cable drive assembly and majority of the support pulleys in this invention are all fully enclosed in a single housing for convenient mounting on a container to be covered. The cable: and pulley assembly of this invention provides a 3:1 cable movement, unlike past arrangements which provided only a 2:1 movement, making deployment and retraction of the cover much faster. The gear drive pulleys help to, overcome or avoid any stop or jamming of the cable, and prevent cable slippage. The housing is self-contained and waterproof, protecting the cable drive assembly from damage as a result of wind shear or inclement weather conditions. The aerodynamic shape of the housing also reduces wind drag forces on the cover. The housing has a cover mounting groove formed into an arched shape matching the shape of the cover bows, avoiding a flat region at the secured end of the cover which in the past has tended to cause wrinkles and fluttering of the tarpaulin, which often results in damage or tearing of the tarpaulin. Thus, this arrangement can potentially increase the tarp lifetime.

Although an exemplary embodiment of the invention has been described above by way of example only, it will be understood by those skilled in the field that modifications may be made to the disclosed embodiment without departing from the scope of the invention, which is defined by the appended claims.

I claim:

1. A cover apparatus for an open-topped container such as a trailer or truck bed, comprising:

a cover for extending over the open top,: of a container, the cover having opposite sides;

a plurality of spaced, parallel bows extending between opposite sides of the cover, each bow having a guide at each end;

an endless cable running through the guide at each end of each bow, a front one of the bows being secured to the cable and the guides on the remaining bows engaging slidably on the cable, a plurality of support pulleys for supporting the cable to extend in a predetermined path along the opposite sides of, the container;

a pair of meshing gear drive pulleys for controlling movement of the cable to extend and retract the cover, the cable extending at least partially around each of the gear drive pulleys; and a reversible drive motor linked to one of the gear drive pulleys.

2. The apparatus as claimed in claim 1, wherein the gear drive pulleys each have at least one cable receiving groove and an outer peripheral rim having a series of gear teeth meshing with the teeth of the other drive pulley.

3. The apparatus as claimed in claim 2, including an adjustable tensioning pulley for adjusting cable tension, a first one of the gear drive pulleys having two spaced cable grooves, the cable passing around one of the grooves in the first drive pulley, around the groove in the second drive pulley, then around the tensioning pulley, and back around the other groove in the first drive pulley, the tensioning pulley being adjustably mounted at a variable spacing from the gear drive pulleys.

4. The apparatus as claimed in claim 1, including an elongate housing having opposite first and second ends for mounting at one end of a container be covered, the housing having a cable access opening at each end, and the motor and gear drive pulleys being mounted in the housing.

5. The apparatus as claimed in claim 4, wherein some of the support pulleys are mounted in the housing.

6. The apparatus as claimed in claim 4, wherein the housing has a lower wall, a front wall, a rear wall for mounting flush against an end of a container to be covered, the front and rear wall having upper ends, and an upper, aerodynamically shaped wall tapering upwardly from the upper end of the front wall to the upper end of the rear wall, the: upper wall having an upper portion with a seat extending across the upper portion between the opposite ends of the housing, the cover having opposite reading and trailing ends, the front bow being located adjacent the leading end of the cover, and the trailing end of the cover being secured to said seat.

7. The apparatus as claimed in claim 6, wherein said seat is of arched shape substantially matching the shape of said bows.

8. A cover apparatus for an open-topped container such as a trailer or truck bed, comprising:

an elongate housing for securing across one end of an open-topped container to be covered, the housing having opposite ends adjacent respective opposite sides of the container;

a cover for extending over the open top of the container, the cover having opposite sides and opposite first and second ends, the first end of the cover being secured to the housing;

a cable and pulley assembly extending through the housing and having side portions extending out of the opposite ends of the housing for extending along opposite sides of the container, the cable and pulley assembly including an endless cable and a series of support pulleys for guiding the cable along a predetermined path along a first side of the container, through the housing, along a second side of the container, back along the second side of the container in the opposite direction, back through the housing, and back along the first side of the container;

the cover having a series of spaced guides along each side, the cable running through the guides;

a pair of meshing gear drive pulleys mounted in the housing for controlling movement of the cable to extend and retract the cover, the cable extending at least partially around each of the gear drive pulleys; and a reversible drive motor mounted in the housing and linked to one of the gear drive pulleys.

9. The apparatus as claimed in claim 8, wherein the majority of the support pulleys are mounted in the housing.

10. The apparatus as claimed in claim 8, wherein the cable and pulley assembly includes a tensioning pulley adjustably mounted in the housing for adjusting the cable tension.

11. The apparatus as claimed in claim 8, wherein the housing is waterproof and forms a complete enclosure for the motor, gear drive pulleys, and a plurality of the support pulleys.

12. The apparatus as claimed in claim 11, wherein the housing has a lower wall, a front wall of a first height, a rear wall of l second height taller than the front wall for mounting against an end of a container adjacent an open top of the container, and an upper wall of upwardly tapering, aerodynamic shape extending from said front wall to said rear wall, the upper wall having an upper portion forming a seat for securing the first end of the cover to the housing.

13. The apparatus as claimed in claim 12, wherein said upper portion has a groove forming said seat.

14. The apparatus as claimed in claim 12, wherein said seat is of arch-like shape between the ends of said housing.

15. The apparatus as claimed in claim 8, wherein each gear drive pulley has a peripheral rim having gear teeth extending around its periphery for meshing engagement with the gear teeth of the other gear drive pulley.

16. The apparatus as claimed in claim 15, wherein each gear drive pulley has at least one cable receiving groove axially spaced from said gear teeth.

17. The apparatus as claimed in claim 16, wherein at least one of said gear drive pulleys has two cable receiving grooves positioned on opposite sides of said toothed peripheral rim, and the cable travels in a path extending at least partially around each of said cable receiving grooves in said gear drive pulleys.

18. The apparatus as claimed in claim 17, including an additional pulley spaced from said gear drive pulleys, said cable path extending around one of said two cable receiving grooves in said one gear drive pulley, around said additional pulley, around the cable receiving groove in the other gear drive pulley, and around the other of the two cable receiving grooves in said one gear drive pulley.

19. The apparatus as claimed in claim 18, wherein said additional pulley is adjustably mounted in said housing for adjusting the cable tension.

20. The apparatus as claimed in claim 18, wherein said housing has a central longitudinal axis, said gear drive pulleys being mounted such that said cable receiving grooves are tilted at an angle to said central longitudinal axis.

21. The apparatus as claimed in claim 20, wherein said additional pulley has a cable receiving groove is tilted relative to! the central longitudinal axis for alignment of said cable receiving groove with the cable receiving grooves of said gear drive pulleys.

22. The apparatus as claimed in claim 21, wherein said additional pulley is also tilted downwardly in a direction transverse to said longitudinal axis, whereby said cable receiving groove on one side of said additional pulley is aligned with one of the two cable receiving grooves in said one gear drive pulley and on the opposite side of said additional pulley is aligned with the other cable receiving groove on said one gear drive pulley.

* * * * *